United States Patent [19]

Hensley

[11] Patent Number: 4,496,464
[45] Date of Patent: Jan. 29, 1985

[54] FILTER APPARATUS AND METHOD

[76] Inventor: Clifford J. Hensley, P.O. Box 6847, Odessa, Tex. 79762

[21] Appl. No.: 538,140

[22] Filed: Oct. 3, 1983

[51] Int. Cl.³ .......................................... B01D 23/24
[52] U.S. Cl. .................................. 210/792; 210/807; 210/269; 210/289
[58] Field of Search ............................... 210/792–796, 210/807, 269, 275–279, 286, 289, 291, 805, 194

[56] References Cited

U.S. PATENT DOCUMENTS

| | | | |
|---|---|---|---|
| 25,761 | 3/1965 | Hirs | 210/108 |
| 2,136,660 | 11/1938 | Martin | 210/144 |
| 3,557,955 | 1/1971 | Hirs . | |
| 3,557,961 | 1/1971 | Stuart . | |
| 3,737,039 | 6/1973 | Hirs | 210/80 |
| 3,757,954 | 9/1973 | Toth | 210/277 |
| 3,780,861 | 12/1973 | Hirs | 210/80 |
| 3,812,969 | 5/1974 | Maroney | 210/274 |
| 4,246,102 | 1/1981 | Hjelmner et al. | 210/793 |
| 4,320,004 | 3/1982 | Schecter | 210/275 |

Primary Examiner—Ivars Cintins
Attorney, Agent, or Firm—Marcus L. Bates

[57] ABSTRACT

A filter system has a filter media comprised of particles of filter material contained within the lower end of a vessel. Liquid flows into the upper end of the vessel and down through the filter media, thereby removing unwanted contaminants from the liquid. When the accumulated contaminant load in the filter media reaches a selected value, the filter media is cleaned of contaminants by vigorously circulating the media within the vessel. This scrubbing action transfers the contaminants from the filter media into the scrub water, and thereby enables the contaminants to be removed from the vessel by discharging the scrub water therefrom. All activity is stopped to enable the media to gravitate back to the bottom of the vessel. The cleaned filter is returned to operation.

14 Claims, 11 Drawing Figures

FILTER APPARATUS AND METHOD

BACKGROUND OF THE INVENTION

Removal of contaminants or debris from a flowing liquid stream by the employment of a filter media comprised of particulated filter material is old in the art, as evidenced by the patents listed herebelow. These prior U. S. patents teach the advantages of using various different sizes of various different particulated filter material. Many of the described filter systems require that the filter media be removed from the filter vessel each time it becomes necessary to scrub the contaminant from the media, thereby enabling the media to be used many times. These prior art systems require a considerable amount of additional space, and complicated plumbing must be connected between the various pumps, valves, and other mechanical members in order to interconnect the scrubbing vessel and filtering vessel so that various different predetermined flow patterns are attained. A substantial amount of equipment is required in order to return the filter media to the filter vessel. In addition to the added cost and the required additional space considerations, all of the external plumbing presents a continued maintenance problem; and, the numerous additional mechanical connections involved therein greatly increase the likelihood of leakage occurring from the different components of the filter system.

Furthermore, when transferring the filter media from the filter vessel into the scrubber vessel, one is never absolutely certain that all of the filter media has been properly translocated from one to the other vessel. Hence, in the absence of visual or other exacting determinations, one is never sure exactly what has been scrubbed in the scrubber vessel. Moreover, after the filter media has been scrubbed in the scrubbing vessel, it is never certain that all of the filter media has been returned to the filter vessel, in the absence of exact determination thereof. Accordingly, it would be desirable to have made available a filter system wherein the filter media remains within the filter vessel for the entire life of the media, and wherein the filter media is scrubbed or rejuvenated without removing the filter media to a second vessel. A filter system which achieves these and other desirable and novel attributes is the subject of the present invention.

| THE PRIOR ART | | | |
| --- | --- | --- | --- |
| Hirs | 25,761 | Martin | 2,136,660 |
| Hirs | 3,557,955 | Stuart, Sr. | 3,557,961 |
| Hirs | 3,737,039 | Toth | 3,757,954 |
| Hirs | 3,780,861 | Maroney | 3,812,969 |

SUMMARY OF THE INVENTION

The invention encompassed by this disclosure broadly comprehends filtering a liquid through a filter media, and thereafter scrubbing the media insitu, and thereafter filtering a liquid through the scrubbed media. More specifically the invention includes a vessel within which there is enclosed a filter media comprised of particles of particulated filter material. A screen means is positioned at the lower end of the vessel and below most of the filter media, while the upper end of the vessel provides a liquid and scrubbing space, with there being a contaminated water inlet, and a clean water outlet attached to the vessel in a manner whereby flow of dirty or contaminated water is conducted into the upper end of the vessel, proceeds down through the filter media, where the filter media removes the contaminants from the flowing liquid, whereupon the clean water flows through the screen, through the outlet, and away from the vessel, leaving the contaminants and media within the vessel.

From time to time, as the removed contaminants progressively accumulate within the vessel, the filter media is scrubbed clean, thereby re-establishing the original filter efficiency. The scrubbing of the media is carried out within the vessel by flowing the liquid along a unique flow path within the vessel, to cause great agitation of the media, to thereby translocate the removed contaminants from the media into the scrubbing liquid. The highly contaminated scrubbing liquid is then discharged from the vessel in an unusual manner, while relatively clean make-up water is added thereto.

Next, the filter media is reset or repositioned into the lower end of the vessel by shutting down all systems which causes the media to gravitate to the bottom. Thereafter, the various flow lines are cleaned by flowing filtered liquid from the vessel, along a closed circuit, and back into the vessel, thereby separating any residual contaminants from the liquid. The filter system is placed back on stream and used until the contaminant load on the media again increases to a magnitude which justifies undertaking another cleaning cycle.

The scrubbing cycle preferably is achieved by disposing the inlet and outlet of a pump means within the upper end of the vessel, and directing the outlet of the pump towards a circulation guide means. The guide means is supported at a central location respective to the interior of the vessel, with the guide means preferably being located slightly above the prescribed media level. The outlet of the pump is connected to a discharge nozzle which is arranged slightly above and in axial alignment with the guide means. This unusual arrangement of the scrubbing apparatus enables the pump suction to take liquid from the upper end of the vessel and to force the liquid through the guide means, whereupon the guide means directs the liquid down towards the bottom of the vessel. This action sets up a desirable flow pattern wherein the filter media becomes intimately admixed with the liquid contained within the vessel and great agitation of the individual particles of the media achieves an unusually efficient cleaning and scrubbing action. The flow at this time follows a geometrical flow path which is in the form of a toroid having a central vortex which coincides with the axial centerline of the vessel, with the outer upward flowing part of the vortex being confined by the inner peripheral wall surface of the vessel.

In one embodiment of the invention, the circulation guide means is in the form of an annular area, with an annulus being formed between an outer barrel and an inner screen means. The inner screen means is preferably cylindrical and arranged to provide the before mentioned outlet through which the heavy contaminated scrubbing water is exhausted from the system during a blow-down cycle which occurs towards the end of the scrubbing cycle. Hence, the inner screen precludes significant loss of filter media from the vessel during the scrubbing cycle. Another screen means is mounted below the filter media near the bottom of the vessel and precludes significant loss of media during the main filtering cycle.

Accordingly, a primary object of the present invention is the provision of method and apparatus for sequentially filtering with and then cleaning a filtering media which is used to filter a stream of liquid.

Another object of the invention is to provide method and apparatus by which a contaminated stream of liquid is filtered for one interval of time to provide separation of the contaminants and the liquid, and the filter media is then scrubbed clean in a new and unobvious manner during another interval of time, with the filtering step and cleaning step both occurring within the same enclosure.

A further object of this invention is to disclose and provide a method of filtering a stream of contaminated liquid by flowing the contaminated liquid into a vessel having a liquid space and a filter media space; whereupon, the contaminated liquid proceeds through the filter media, thereby leaving the contaminant within the media, so that clean, filtered liquid exits from the vessel; and, thereafter, the filter media is scrubbed without removing the media from the vessel.

A still further object of this invention is to provide an unusual and unobvious filter system having particles of filter media contained therein which filters contaminants from a flowing liquid, and wherein the filter media is occasionally scrubbed clean of contaminants, and the contaminants removed from the system, with both the scrubbing and filtering action occurring within the same vessel.

Another and still further object of the present invention is the provision of method and apparatus by which contaminated liquid flows into a liquid containing part of a vessel, through a filter media containing part of the vessel, thereby filtering the contaminant from the liquid and providing clean liquid as the liquid stream exits the vessel. The filter media is scrubbed within the vessel by flowing liquid through a circulation guide means which agitates the mixture of liquid and filter media in a manner to cause the contaminants to be translocated from the media into the liquid. The contaminated liquid is replaced with relatively clean liquid, and thereafter the filter media is repositioned within the media containing part of the vessel. A closed circuit flow path cleans contaminated liquid from the lines, and the filter then resumes efficient operation until the load of contaminant on the media necessitates another scrubbing cycle.

An additional object of the present invention is the provision of apparatus by which a contaminated stream of liquid is cleaned by flowing the contaminated liquid through a vessel containing particulated filter material which separates the contaminants from the liquid as the liquid flows therethrough. The media is scrubbed within the vessel by the employment of a pump means which flows liquid within the vessel along a toroidal flow path achieved with a circulation guide means. The circulation guide means causes the contaminants to be translocated from the filter media into the liquid contained within the vessel so that the contaminated liquid can be disposed, while relatively clean liquid flows thereinto.

These and other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described in the above abstract and summary.

DETAILED DESCRIPTION OF THE PREFERRED EMBODIMENTS

Figure 1:
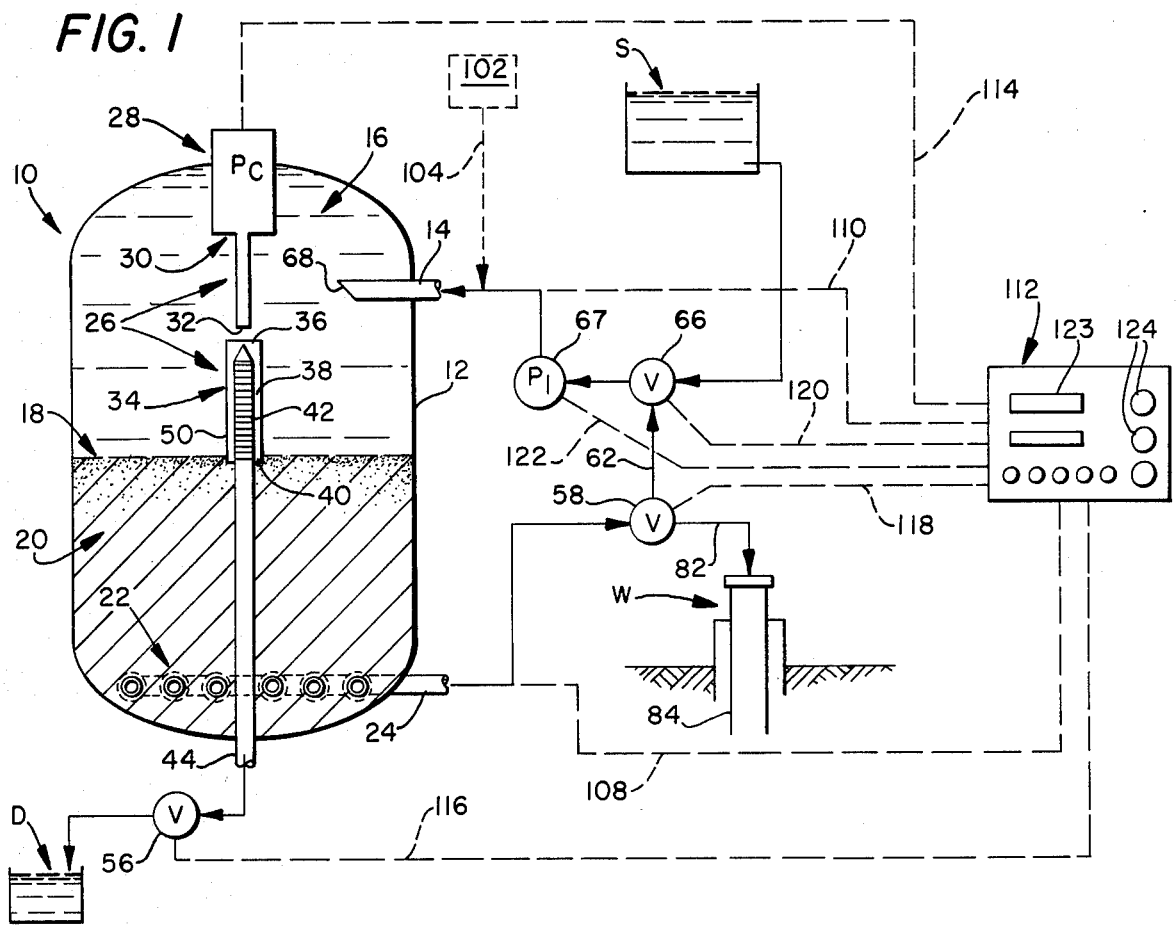
FIG. 1 is a part diagrammatical, part schematical, side elevational view of a filter system made in accordance with the present invention.

In FIG. 1, there is disclosed a filter system 10 made in accordance with the present invention. The system 10 includes a vessel 12 having an inlet 14 located at the upper extremity 16 thereof. A filter media level 18 is defined by the uppermost surface of the particulated filter material 20 which is enclosed within the lower end of the vessel 12. A screen means 22, which can take on several different forms, is supported within the lowermost end of the vessel, and preferably is comprised of an array of screens, the details of which will be more thoroughly discussed later on in this disclosure. The screen means 22 is connected to outlet 24.

The arrows at numeral 26 broadly indicate scrubbing apparatus, made in accordance with the invention, by which the filter media 20 can be scrubbed while remaining within the interior of the vessel 12. The scrubbing apparatus includes a pump means 28 having a suction 30 located to receive flow from the upper end 16 of the vessel, and further includes the illustrated outlet shown connected to an outlet nozzle 32. A circulation guide means 34 is provided with a guide inlet 36, annulus 38, guide outlet 40, and interior scrubbing screen means 42. A back-wash discharge 44 is connected to receive flow from annulus 38, with the back-wash flow being directed through screen 42, so that liquid exits through the back-wash discharge 44.

Figure 3:
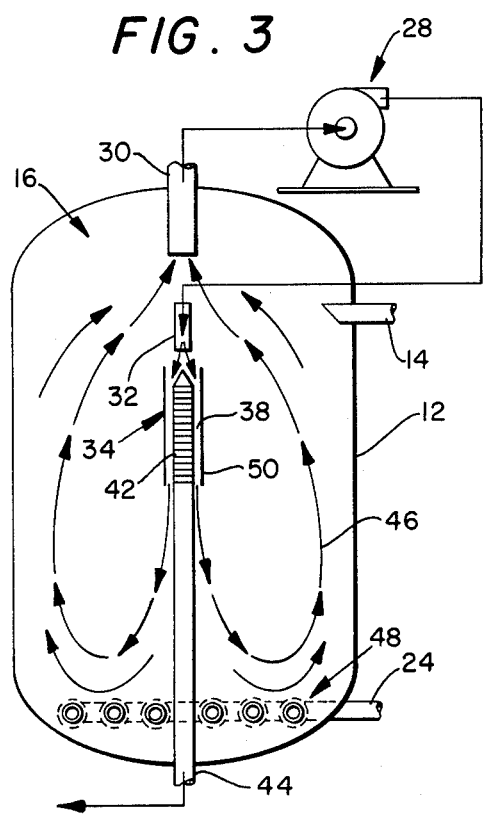
FIG. 3 is a part diagrammatical, part schematical representation showing the filter system of FIGS. 1 and 2, shown in another operative configuration.

As best seen illustrated in FIG. 3, during a scrubbing cycle a toroidal flow path 46 is established within the vessel 12, with the entire contents of the vessel being forced to assume the toroidal flow path and flow from the lower end 48 to the upper end 16 of the vessel, as illustrated. Numeral 50 indicates an outer barrel which forms part of the circulation guide means 34.

Figure 4:
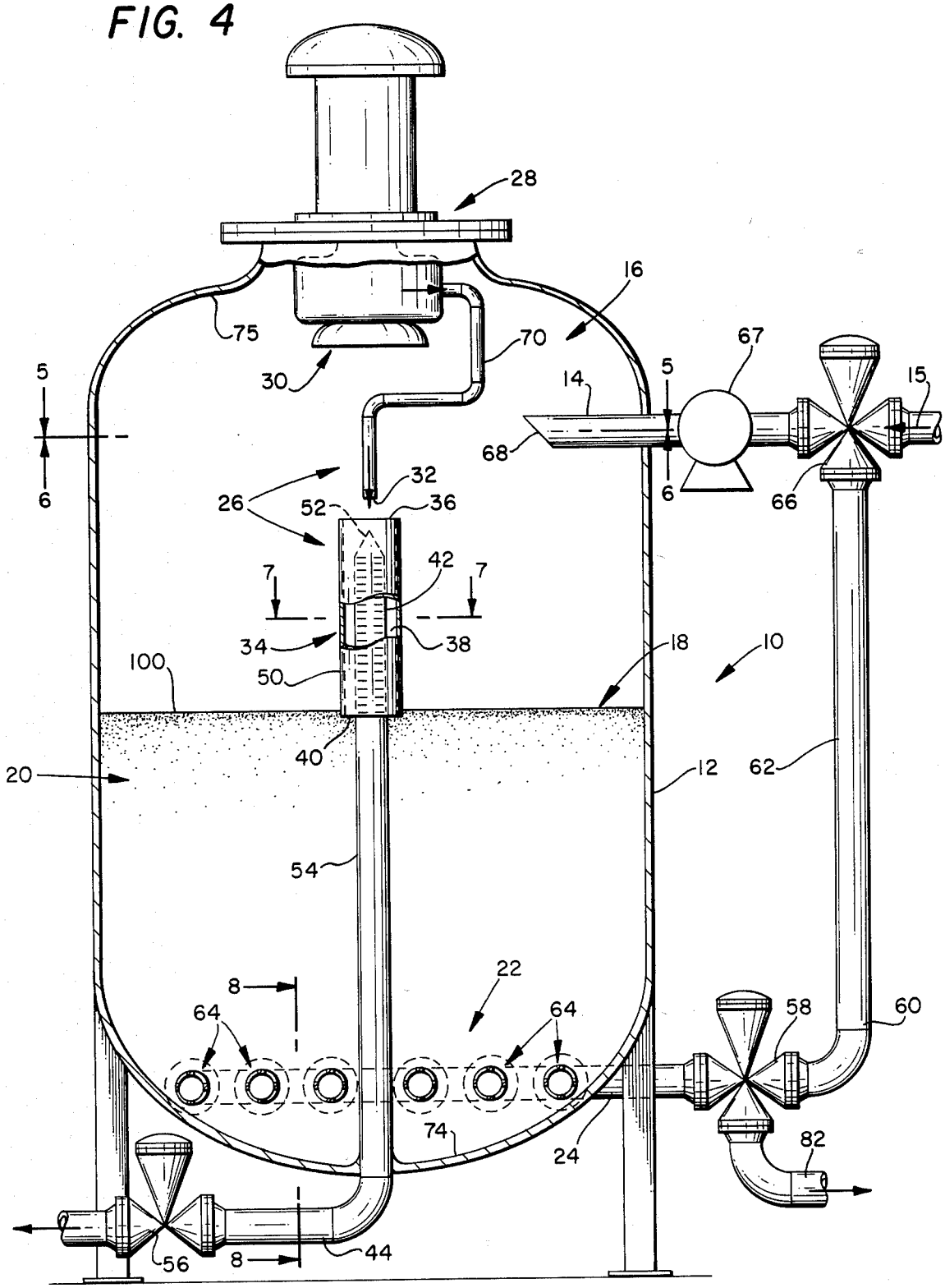
FIG. 4 is an enlarged, more detailed, longitudinal, cross-sectional representation of a filter apparatus made in accordance with the present invention.
Figure 5:
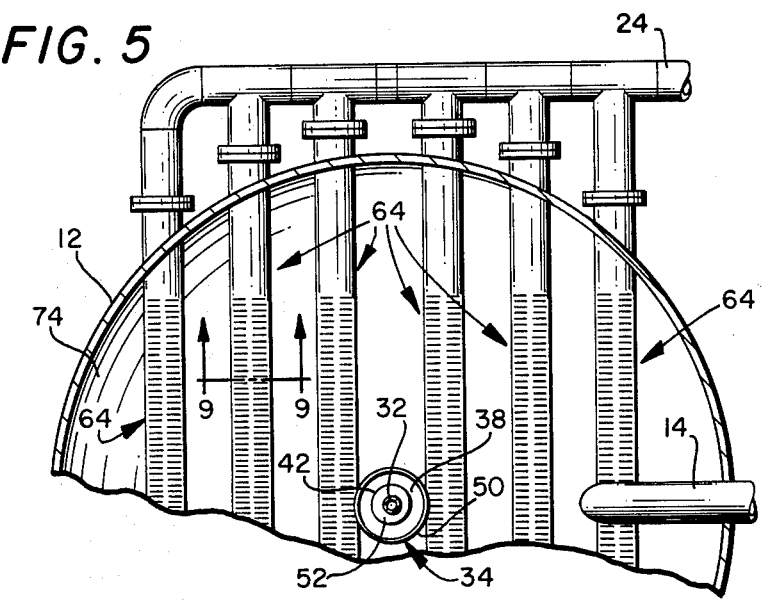
FIGS. 5, 6, 7, and 8, respectively, are cross-sectional views taken along lines 5—5, 6—6, 7—7, and 8—8, respectively, of FIG. 4.
Figure 6:
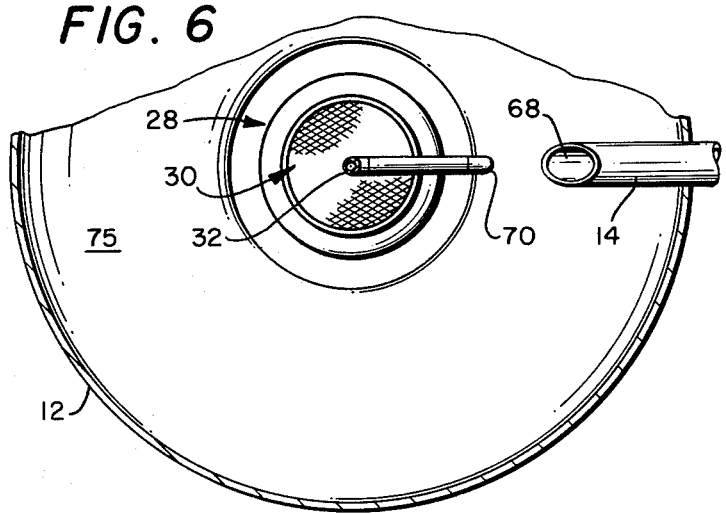
Figure 8:
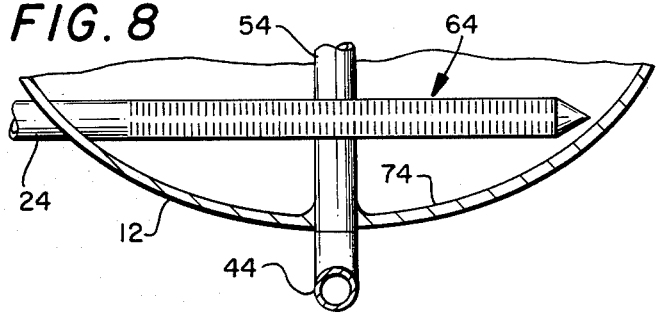

In FIGS. 4–10, together with other figures of the drawings, there is disclosed additional details of the present invention. As seen in FIG. 4, for example, the free upper terminal end 52 of the scrubbing inner screen means 42 is positioned in close proximity of the circulation guide inlet 36. The scrubbing screen means 42 is supported by a vertical support conduit 54. Conduit 54 is connected to the back-wash discharge 44. Valve 56 controls the flow of liquid through the back-wash discharge.

The before mentioned outlet header 24 is connected to a three-way valve 58 which controls flow of liquid from the vessel to a clean water outlet 60, and to conduit 62, which is a feed pump suction for clean tube purge cycle. Numeral 64 generally indicates a plurality of lower screens, each of which are connected to the before mentioned outlet header 24. The lower screens are located near the bottom of the vessel 12, and the details thereof will be more fully discussed later on in this disclosure.

Three-way valve 66 is connected to control the flow of contaminated water to pump 67 and into the inlet 14, and to receive flow from conduit 62. Numeral 68 indicates the free terminal end of the piping which forms the inlet 14.

Figure 9:
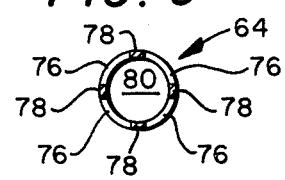
FIG. 9 is a cross-sectional view taken along line 9—9 of FIG. 5.
Figure 10:
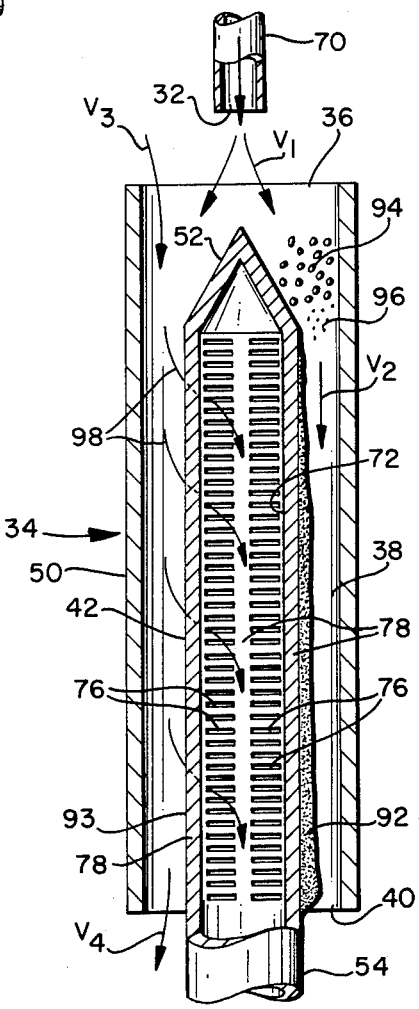
FIG. 10 is an enlarged, detailed, cross-sectional view of part of the apparatus disclosed in some of the foregoing figures; and, FIG. 11 is a fragmentary, detailed, part cross-sectional representation of a modification of part of the present invention.

In FIGS. 4 and 10, a pump discharge line 70 is connected to the outlet of pump 28. The pump 28 preferably has the suction 30 thereof located within the upper end 16 of the vessel, below the liquid level thereof, so that inexpensive seals such as associated with an open impeller can be advantageously employed in the system. Numeral 72 indicates the interior of the inner scrubbing screen means. In FIG. 4, numeral 74 indicates the bottom of vessel 12 while numeral 75 indicates the top thereof. In FIG. 9, the lower screen 64 and inner screen 42 are seen to be provided with a plurality of slots 76 which are discontinuous, thereby leaving lands 78 by which the slotted screen elements are attached to one another. Numeral 80 indicates the interior of the lower screens.

Figure 2:
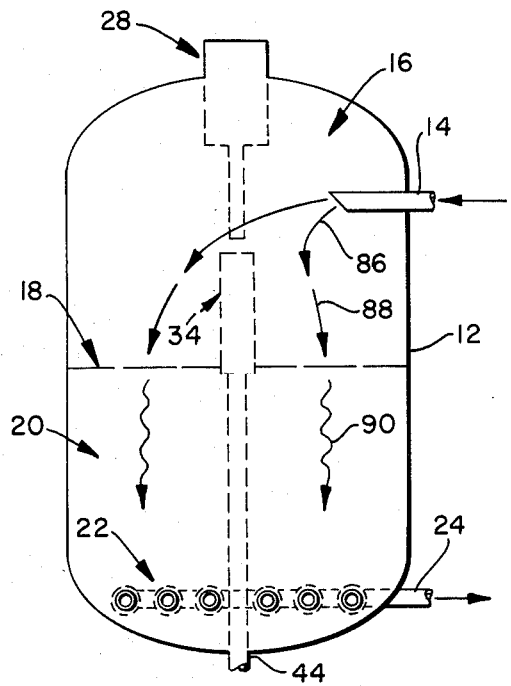
FIG. 2 is a diagrammatical representation of part of the system seen in FIG. 1, and showing the flow characteristics during one part of the cycle of operation of the system.

In FIGS. 1 and 2, it will be noted that valve 58 is connected to provide flow along two different flow paths, one of which is a closed path defined by 24, 58, 62, 66, 67, 14, 16, 18, 20, and 22. The valve 58 is also connected to provide flow from 24, 58, 82, and into the wellhead W and down through the string of well tubing 84.

As seen in FIG. 2, during the filtering mode of the invention, flow occurs from inlet 14, proceeds down through the upper end 16 of the vessel 12 as noted by numeral 86, where the flow continues in a downward direction at 88 through the top 18 of the filter media 20 as indicated by the arrow at numeral 90, where the flow enters the lower screens 22 and continues through the header at outlet 24, thereby providing clean water free of contaminants.

In FIG. 10, numeral 92 indicates a build-up or layer of filter material on the inner screen, while numeral 93 indicates the absence of any appreciable amount of filter media attached to the inner screen. Numeral 94 and 96 indicate the dynamic flow of particles of filter material admixed with contaminants through the annulus 38. As indicated, the discharge nozzle 32 provides a flow at velocity V1 which is reduced to velocity V2 as the flow is induced through annulus 38. Velocity V3 indicates entrained liquid from proximity of the inlet end 36 of the circulation guide. Velocity V4 indicates the velocity of material exiting the circulation guide outlet. The arrows at numeral 98 indicate highly contaminated liquid flowing into the interior 72 of the scrubbing inner screen means 42.

The scrubbing cycle is diagrammatically disclosed in FIG. 3, wherein a toroidal flow path 46 is established down through the annulus 38 and up along the outer annular area of the vessel 12. Pump suction 30 is connected to pump 28 which provides flow through nozzle 32 of piping 70. During the first part of the scrubbing cycle, it is preferred that only the internal toroidal flow path 46 be employed. During the latter part of the scrubbing cycle, contaminants are evacuated from the liquid phase of the vessel as a back-wash discharge at 44, while make-up water at 67 replaces the discharged material.

Figure 11:
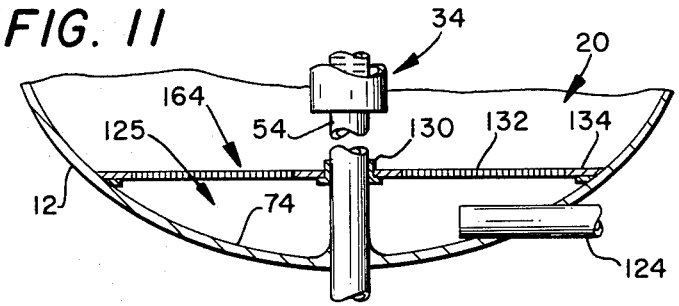
Figure 7:
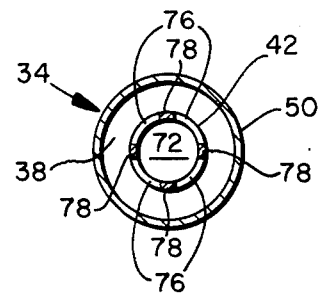

In FIG. 11, a screen means in the form of a flat plate 164 has been substituted for the wedge tubes. The flat plate member 164 has closely spaced slots 132 formed therein, thereby forming a lower screen 164 for supporting the filter media 20. Outlet 124 is connected to chamber 125 formed by the lower screen means 164.

In FIG. 1, a pressure sensor is connected at 108 to pipe 24, and at 110 to pipe 14, thereby enabling the computer 112 to monitor the pressure drop across the media. Scrubbing pump 28 is controlled at 114, while the operation of valves 56, 58, and 66 are computer controlled by circuitry 116, 118, and 120. Feed pump 67 is computer controlled by circuitry 122.

The computer is programmed to switch the variables of the system to achieve various modes of operation in accordance with the desired program thereof.

OPERATION

The method of the present invention is set forth in FIGS. 1–3, wherein, in FIG. 1, there is disclosed a source of contaminated liquid S, as for example salt water containing the following contaminants: sludge, scale, dirt, fiber, and other debris of relatively small particle size which is inherently suspended within the liquid pumped at P1 and through the valve 66. The valve 66 is a three-way valve which enables liquid to flow from S into the inlet 14, or alternatively from valve 58 and then through the inlet 14.

In the first mode of operation, contaminated liquid enters the upper end 16 of the vessel 12 and flows down through the filter bed 20 in the indicated manner of FIG. 2, whereupon the contaminants are removed from the liquid, and clean liquid exits at header outlet 24. The clean liquid at 24 flows along conduit 24, through three-way valve 58, into the wellhead W of the illustrated borehole, down through the tubing string 84 and into a geological strata located downhole in the borehole.

It should be understood that the employment of clean filtered water at 24 for purposes of the illustrated water flooding at W is illustrative of one of a multitude of uses for the apparatus and method of the present invention. Similarly, the use of contaminated salt water at source S is illustrative of one of a manifold of different liquid streams requiring filtration which can be used according to method and apparatus of the present invention.

The filtering process continues in accordance with FIGS. 1 and 2 until the magnitude of the removed contaminants unduly increase the load on the filter media, causing the pressure drop across the media 20 to attain the threshold of uneconomical or inefficient operation. At this stage of the operation, valves 58 and 66 are moved to the alternate closed positioned while simultaneously pump 28 is energized and pump means 67 is rendered isolated, thereby setting up the illustrated toroidal flow path seen indicated in FIG. 3, which represents the second mode of operation and the first phase of the scrubbing cycle of the system. At this time, as illustrated in FIG. 10, the velocity V1, V2, V3, and V4 of the flowing material is of a sufficient magnitude to intimately disperse particles 94 of the entire media 20 and contaminants 96 throughout the liquid contained within the vessel 12, so that the individual particles 94 of the filter media 20 continually abrade against one another, and great sheer forces are setup between the agitated liquid, media, and contaminants. During this mode of operation, flow occurs from the upper end 16 of vessel 12, into suction 30 of pump 28, through discharge nozzle 32 of the scrubbing apparatus, down through the annular area 38, where the flow is directed down towards the bottom 74 of the vessel 12, with the flow pattern describing the illustrated toroidal configuration 46 set forth in FIG. 3. The scrubbing cycle is continued for the required length of time for translocating sufficient contaminants from the media into the scrubbing liquid required to subsequently restore the media to efficient filtering condition.

During the third mode of operation, which is also the second phase of the scrubbing action, valves 56 and 66 are moved to the open position, whereupon scrubbing liquid flows from the vessel while make-up liquid flows through pump 67 and into the inlet 14. Clean make-up liquid at 102 (FIG. 1) can be ingested into the system at 104 if considered necessary; however, it is preferred to use second order dirty water at S, depending upon the concentration of contaminants contained within liquid S during this blow-down or third mode of operation. The rate of flow of make-up liquid at 14 equals the rate of discharge of the highly contaminated liquid being discharged at 44.

When the discharge at D indicates that the residual liquid flowing at 46 has been substantially replaced by relatively clean liquid, the system is changed to the fourth mode of operation, wherein valve 56 is closed and pump 28 is de-energized. The system then lies dormant while the filter media gravitates back into a bed 20. This fourth mode of operation is an important step in the operational cycle for it causes the media particle size to be stratafied or layered with the media size being graduated towards the larger size in a downward direction. This novel action has the unexpected advantage of placing the larger particles of filter material adjacent to the lower screens which minimize plugging the screen openings. Next the system is caused to assume the fifth mode of operation, wherein the pump 67 is energized, and the apparatus is arranged into the scavaging configuration as follows: valve 56 remains closed while valves 58 and 66 are shifted, whereupon liquid flows along a closed circuit comprised of outlet 24, valve 58, conduit 62, valve 66, pump 67, inlet 14, where liquid flows into the upper end 16 of the vessel 12, down through the filter media 20, into the header 24, until the liquid contained within the closed circuit is cleaned of all contaminants, and the media bed is set into place in response to the pressure differential effected thereacross. Thereafter, valves 58 and 66 are moved to another alternate position, thereby returning the apparatus back to the first mode of operation or to the filtering configuration seen illustrated in FIG. 2. This last shift in operation provides an unexpectedly smooth transition in modes and eases the system back on line with a minimum of disturbances due to the unique uninterrupted closed to opened flow paths involved.

Example. A vessel 12, which measures 10 feet in diameter and 12 feet in height, is provided with a 75 horsepower pump means 28 having the suction and discharge thereof arranged in the manner of FIGS. 1 and 4, and capable of delivering 3000 gpm. The scrubbing apparatus 26 further includes a barrel 50 having an inside diameter 24 inches, and length 4 feet, with there being a scrubbing screen means 42 located therein having an outside diameter of 20 inches, and a length of 4 feet, thereby leaving an annulus 38 which measured 2 inches from the exterior surface of the inner screen to the interior surface of the barrel. The screen 42 is preferably a commercially available wedge wire tube having 0.015 inch openings. The free end 52 of the screen 42 is located approximately one inch below inlet end 36 of the barrel, while the discharge end of nozzle 32 is located above inlet end 36 of the barrel. The outlet end 40 of circulation guide 34 is located approximately 2 inches above the desired or design level 18 of media 12, which varies depending upon the compactness of the media 20 during operation as well as the amount of media charged into the vessel; consequently, sometimes the media is slightly above outlet 40 at the beginning of the filtration cycle, and sometimes the media is below the outlet 40 at the end of the cycle. The media selected is 12–20 particle size (screened) walnut shells. Support 54 is a standard 4 inch pipe.

The outlet header 24 is 6 inches in diameter while the individual screens 64 were laterally arranged respective to the header 24, and each is provided with an effective screening length of 2 feet. The screens 64 are provided with 0.015 inch slots. The screens 64 preferably are wedge wire tubes.

As noted, the screens in the above examples are preferably wedge wire tubes having bars connected together in the manner illustrated at 78 in FIG. 9, with there being an 0.015 inch slot between adjacent bars, and the bars being $\frac{1}{8}$ inch in thickness. This material is a commercially available product.

The filter media 20 preferably is walnut hulls which passes through a 12 mesh screen and are caught on a 20 or 30 mesh screen, depending upon the characteristics of the removed contaminants.

Feed pump 67 is a 40 horsepower pump designed to deliver 1000 gallons per minute at 50 psi.

12,000 pounds of media 20 in the form of 12–20 walnut shells can be directly or indirectly charged into the lower end of the vessel 12, and all the compressible fluid thereafter exhausted from the upper end of the vessel as flow of liquid occurs at 14. The characteristics of the contaminated liquids were as follows: The inlet water is fresh or salt water containing inert particles of iron sulfide, sand, metal particles, and semi-soluble particles of oil, waxes, paraffins, asphalts, and the like.

After the system had reached equilibrium, the characteristics of the liquid exiting at outlet 24 was found suitable for injection into a downhole formation of a water flood injection well. The system removes the filterable solids and organics up to 1 ppm of a size greater than 1 micron depending on specific characteristics of the filterable contaminants.

The apparatus filters a stream of liquid flowing at a rate of 30,000 barrels per day into inlet 14, with the initial pressure drop measured at sensors 108 and 110 being 3–5 psi $\Delta P$. At the end of 18 hours, the pressure drop across media 20 had increased to 15–25 psi $\Delta P$, at which time the rejuvenation cycle was commenced in the above described manner. The scrubbing cycle was carried out for 20 minutes, with scrubbing action lasting 15 minutes, and with discharge through conduit 44 occurring during the last 14.5 minutes of the 15 minute cycle. During this 14.5 minutes, relative clean makeup water or second order dirty water entered the vessel at 67 flowing at the rate of about 600 gallons per minute into the inlet 14, while a similar amount of very dirty water was discharged at 44. Thereafter, a delay of 3 minutes enables the media to gravitate into a bed, as previously described above, and then valves 58 and 67 were shifted to the appropriate position to provide the closed circuit flow for a time interval of 2 minutes, thereby cleaning up all of the lines flowing from the clean water outlet 24, and setting the bed. The system was then returned to mode 1, or the on stream and filtering mode.

The method of this invention therefore involves five modes of operation as follows:

Mode 1: on stream or filtering for 18 to 24 hours;
Mode 2: scrubbing cycle, 15 minutes;
Mode 3: blowdown cycle, 14.5 minutes of the above 15 minutes;
Mode 4: gravitate bed into position, 3 minutes;
Mode 5: set bed and scavage closed circuit, 2 minutes.

Total rejuvenation time 20 minutes for modes 2, 3, 4, and 5.

I claim:

1. Method of filtering contaminants from a stream of fluid comprising the steps of:
    (1) placing a first screen means within a vessel;
    (2) placing a filter media upstream of said first screen means and within said vessel, said filter media being made of a multiplicity of discrete pieces of filter material which substantially will not pass through said first screen means;
    (3) flowing contaminated liquid into the vessel, through the media, through the first screen means, and away from the vessel, while the contaminant is deposited on the media;
    (4) cleaning the media of most of the accumulated contaminant while the media predominately remains within the vessel by carrying out the following steps:
        (a) placing the suction of a pump in communication with the liquid contained within the vessel;
        (b) placing the discharge of said pump within the vessel in spaced relationship respective to said pump suction;
        (c) placing a second screen means within said vessel and in spaced relationship respective to said discharge;
        (d) flowing contaminated liquid contained within said vessel into said pump suction, through said pump discharge, and across said second screen means at a rate to cause substantially all of the liquid and the media to be agitated with great force, thereby scrubbing the media predominately within said vessel, and causing most of the contaminants to be translocated from the media into the liquid;
        (e) discharging the liquid ladened with contaminants through the second screen means and from the vessel while flowing relative uncontaminated liquid into the vessel until most of the suspended contaminants have been removed from the vessel;
    (5) reducing the velocity of flow to a value which enables the media to settle into a filter bed;
    (6) repeating step (3).

2. The method of claim 1 and further including the step of enclosing said second screen means within a hollow enclosure, and providing an annular area between the enclosure and the second screen means; arranging the pump outlet axially respective to the hollow enclosure; and flowing the liquid and media through the annular area formed between the second screen means and the hollow enclosure.

3. Method of filtering contaminants from a liquid, comprising the steps of:
    (1) enclosing a filter media within one end portion of a vessel, using the other end portion of the vessel for holding a liquid;
    (2) placing a first screen means within said one end of the vessel and supporting most of the media upstream of the first screen means, said first screen means is of a size to substantially preclude the media from passing therethrough;
    (3) flowing contaminated liquid into said other end of the vessel and conducting the flow through the filter media, through the first screen means, and away from the vessel while the contaminant is deposited on the media;
    (4) carrying out step (3) until the load of the contaminants removed by the filter media produces a pressure drop across the filter media which is significantly greater than the pressure drop at the commencement of step (3);
    (5) scrubbing the filter media by flowing the liquid contained within the vessel along a tortious path within the vessel; placing a nozzle means in spaced relation respective to a guide means, placing a second screen means within the guide means and forming an annular area between the second screen means and the guide means; enclosing said nozzle means, guide means, and second screen means within the vessel;
        aligning the nozzle means, guide means, and second screen means with respect to one another, while directing flow from the guide means towards said one end portion of the vessel;
        flowing liquid from the interior of the vessel, through the nozzle, through the annular area and towards the filter media, thereby effecting the tortious flow path;
        flowing liquid from the annulus, through the second screen means, and away from the vessel until most of the suspended contaminants have been removed from the liquid contained within the vessel;
    (6) flowing a relatively clean liquid into the vessel while the contaminant laden liquid is removed from the vessel, thereby leaving the scrubbed media within the vessel;
    (7) redepositing the scrubbed media in said one end of the vessel, and then repeating step 3.

4. The method of claim 3 and further including the steps of:
    carrying out the scrubbing step while make-up liquid is added to the vessel at substantially the same rate that the concentrated contaminated liquid is removed through the second screen means;
    discontinuing the flow of make-up liquid to enable the contents of the vessel to be dormant while the media gravitates to the bottom of the vessel; flowing liquid in a closed circuit which includes the vessel; and thereafter repeating step (3).

5. Method of removing suspended contaminants from a liquid comprising the steps of:
    (1) placing a first screen means within the interior of a vessel;

(2) partially filling the interior of the vessel with a filter media which is located upstream of said first screen means; said media being made of individual pieces of filter material having an average size which is greater than the size of the openings in said first screen means;

(3) flowing liquid containing suspended contaminants therein into the vessel and forcing the liquid to flow through the media, through the first screen means, and away from the vessel, thereby removing a significant quantity of the contaminants from the liquid and depositing the removed contaminants onto the media;

(4) discontinuing step (3) and then scrubbing a substantial quantity of the deposited contaminants from the media by flowing a relatively large stream of the liquid contained within the vessel along a flow path within the vessel to cause the media to become suspended within the liquid, and which transfers the removed contaminants from the media into the liquid;

(5) mounting a second screen means within the vessel in spaced relation respective to the first said screen means and discharging the contaminated liquid through said second screen means and along a flow path which is distinct from the flow path followed during step (3);

(6) circulating relatively clean liquid through the vessel while the media is returned to the location upstream of the first screen means, and until some of the contaminants contained within the relatively clean liquid is removed by the filter media; and then resuming the filtering operation of step (3).

6. A filter system for removing contaminants from a liquid flowing through the system comprising:
   a vessel having an inlet for providing a contaminated liquid flow into one end thereof and an outlet through which filtered liquid can exit the vessel;
   a screen means supported adjacent said outlet and within the vessel; said vessel being adapted to hold a quantity of particulated filter media therein in supported relationship respective to the screen means;
   a scrubber apparatus contained within the interior of said vessel by which the filter media can be cleaned; said scrubber apparatus includes a pump means having a suction and a nozzle; a second screen means, a barrel, said second screen means is located within said barrel and forms an annulus therebetween; and, an outflow pipe connected to receive flow from said second screen means;
   said pump means suction inlet is located to receive flow of liquid from the interior of said vessel; and said nozzle, second screen means, and barrel are aligned in a manner whereby liquid and filter media can be made to assume a torodial flow path which scrubs the media and translocates the removed contaminants from the vessel.

7. The filter system of claim 6 wherein said liquid inlet, clean liquid outlet, and scrubber discharge, respectively, include first, second, third valve means, respectively, located to provide a filtering circuit, a closed scrubber circuit, comprised of said first and second valve means and a flow path formed between said first and said second valve means;
   so that the second valve means can be closed while the first said valve means is open to thereby cause make-up water to enter the vessel while dirty water exits the vessel, and thereafter the first and second valve means are opened and the third valve means closed to return the filter media to its bed and clean the residual liquid contained within the filter system.

8. The filter system of claim 6 wherein said first screen is a plurality of tubular elements horizontally supported in the lower end of the vessel at an elevation to enable most of filter media to be thereabove;
   said second screen is a tubular element arranged vertically within said barrel so that flow occurs through the annulus, formed between the second screen and the barrel; so that the filter media and liquid can be scrubbed by flowing liquid through the annulus in a torodial configuration.

9. The filter system of claim 6 wherein said liquid inlet, clean liquid outlet, and scrubber discharge, respectively, include first, second, and third valve means, respectively, located to provide a filtering circuit, a closed scrubber circuit, comprised of said first and second valve means and a flow path formed between said first and second valve means;
   so that the second said valve means can be closed while the first said valve means is open to thereby cause make-up water to enter the vessel while dirty water exits the vessel, and thereafter the first and second valve means are opened and the third valve means closed to return the filter media to its bed and clean the residual liquid contained within the filter system;
   said first screen is a plurality of tubular elements horizontally supported in the lower end of the vessel at an elevation to enable most of filter media to be thereabove;
   said second screen is a tubular element arranged vertically within said barrel so that flow occurs through the annulus, formed between the second screen and the barrel; so that the filter media and liquid can be scrubbed by flowing liquid through the annulus in a torodial configuration.

10. Method of filtering contaminants from a stream of fluid, comprising the steps of:
    (1) providing a first screen means within a vessel;
    (2) providing a filter media upstream of said first screen means and within said vessel, said media being made of a multiplicity of discrete pieces of filter material which substantially will not pass through said screen means;
    (3) arranging the suction of a pump in communication with the interior of the vessel and in spaced relationship to said media;
    (4) arranging the discharge of the pump in communication with the interior of the vessel in spaced ralationship respective to said media and respective to the pump suction;
    (5) providing a second screen means within said vessel and in spaced relationship respective to the pump discharge;
    (6) arranging said second screen means within an elongated hollow enclosure and in spaced relationship thereto, thereby providing an annular area between the enclosure and the second screen means;
    (7) arranging the pump outlet axially respective to the hollow enclosure to cause any liquid and media circulated by the pump to flow along a path which describes a toroid with the interior part of the toroid being formed by the annular area;

(8) flowing contaminated liquid into the vessel, through the media, through the first screen means, and away from the vessel, while the contaminant is deposited on the media;

(9) cleaning the media by flowing contaminated liquid contained within said vessel into said pump suction, through said pump discharge, to cause substantially all of the liquid and the media to be agitated with great force, thereby scrubbing the media within said vessel, and causing most of the contaminants to be translocated from the media into the liquid;

(10) discharging the liquid ladened with contaminants through said second screen means and from the vessel while flowing relatively uncontaminated liquid into the vessel until most of the suspended contaminants have been removed from the vessel;

(11) reducing the velocity of flow to a value which enables the media to settle into a filter bed; and, repeating step (8).

11. Method of filtering contaminants from a stream of fluid, comprising the steps of:

(1) enclosing a first screen means within a vessel; placing a filter media upstream of said first screen means and within said vessel, said media being made of a multiplicity of discrete pieces of filter material which substantially will not pass through said first screen means;

(2) flowing contaminated liquid into the vessel, through the media, through the first screen means, and away from the vessel, while a substantial amount of the contaminant is deposited on the media;

(3) enclosing a second screen means within a hollow member to provide an annulus between the second screen means and the hollow member; arranging the hollow member centrally within the vessel and directing the hollow member towards said first screen means; connecting a pump means respective to the vessel so that the pump inlet receives liquid from the vessel and the pump outlet discharges liquid through the hollow member;

(4) cleaning the media of most of the accumulated contaminant by flowing liquid contained within the vessel through the pump with sufficient velocity to cause all of the media to be fluidized, and the pumped liquid and media assume a toroidal flow path which extends through the hollow member, and most of the contaminants transferred into the flowing liquid, and discharging a stream of liquid ladened with contaminants from the vessel while relatively clean make-up liquid is being added to the vessel; and thereafter, reducing the velocity of flow to a value which enables the media to settle into a filter bed; and thereafter, repeating step (2).

12. Method of filtering contaminants from a liquid, comprising the steps of:

(1) placing a filter media within a vessel and allowing the media to gravitate to the lower end portion thereof; while using the upper end portion of the vessel for holding the liquid;

(2) placing a first screen means within the lower end of the vessel with most of the media being located upstream of the screen means, said screen means is of a size to preclude the media from passing therethrough;

(3) flowing contaminated liquid into the upper end of the vessel and conducting the flow through the filter media, through the first screen means, and away from the vessel, while the contaminant is deposited on the media;

(4) carrying out step (3) until the load of the contaminants removed by the filter media produces a pressure drop across the filter media which is significantly greater than the pressure drop at the commencement of step (3);

(5) scrubbing the media by flowing the liquid contained in the vessel along a toroidal path within the vessel at a velocity which causes the media to become suspended within the flowing liquid, and continuing the scrubbing action until most of the removed contaminants have been scrubbed from the media and are suspended within the flowing liquid;

(6) flowing a relatively clean liquid into the vessel while the contaminant laden liquid is removed from the vessel, thereby leaving the scrubbed media within the vessel;

(7) redepositing the scrubbed media in the lower end portion of the vessel, and then repeating steps (3) through (6);

(8) carrying out step (5) by directing the discharge from a pump means into the entrance of a guide means, placing a second screen means within the guide means and forming an annular area between the second screen means and the guide means;

(9) axially aligning the pump discharge, guide means, and second screen means with respect to one another, while directing flow from the guide means towards the bottom of the vessel;

(10) flowing liquid from the upper end of the vessel, through the pump means, and through the pump discharge, to thereby direct a flow through the annular area and towards the media, thereby causing the toroidal flow pattern;

(11) flowing liquid from the annulus, through the second screen means, and away from the vessel until most of the suspended contaminants have been removed from the liquid contained within the vessel.

13. The method of claim 12 and further including the steps of:

carrying out the scrubbing step while make-up water is added to the vessel at substantially the same rate that the concentrated contaminated liquid is removed through the second screen means;

discontinuing the flow of liquid into the vessel to enable the contents of the vessel to be dormant while the media gravitates to the bottom of the vessel; flowing liquid in a closed circuit which includes the vessel before repeating steps (3) through (6).

14. Method of removing suspended contaminants from a liquid, comprising the steps of:

placing a first screen means within the interior of a vessel;

partially filling the interior of the vessel with a filter media which is supported upstream of said screen means; said media being made of individual pieces of filter material having an average size which is greater than the size of the openings in said first screen means;

flowing liquid containing suspended contaminants into the vessel and forcing the liquid to flow through the media, through the first screen means, and away from the vessel, thereby removing the contaminants from the liquid and depositing the contaminants onto the media;

forming an annulus between a guide means and a second screen means and positioning a nozzle means to direct flow through said guide means; aligning said nozzle means and guide means respective to the vessel whereby flow from the interior of the vessel through the nozzle, through the guide means effects a torodial flow pattern comprised of a mixture of liquid and media wherein the center of the toroidal flow pattern occurs within the guide means;

scrubbing the deposited contaminants from the media by flowing a relatively large stream of the liquid contained within the vessel through said nozzle and along the toroidal flow path within the vessel to cause the media to become suspended within the liquid, and thereby transfer the removed contaminants from the media into the liquid; while a relatively small stream of liquid containing the removed contaminants is caused to flow through the second screen means and away from the vessel for disposal;

returning the media into the supported upstream location respective to the first screen means, and again flowing liquid containing suspended contaminants into the vessel and forcing the liquid to flow through the scrubbed media.

* * * * *